United States Patent [19]

Heshmat et al.

[11] Patent Number: 4,863,291
[45] Date of Patent: Sep. 5, 1989

[54] BEARING ASSEMBLY

[75] Inventors: Hooshang Heshmat, Latham, N.Y.; Paul T. Gorski, Greer, S.C.

[73] Assignee: Reliance Electric Company, Greenville, S.C.

[21] Appl. No.: 220,381

[22] Filed: Jul. 12, 1988

Related U.S. Application Data

[60] Continuation of Ser. No. 4,213, Jan. 5, 1987, abandoned, which is a division of Ser. No. 790,188, Oct. 22, 1985, abandoned, which is a continuation-in-part of Ser. No. 740,236, May 31, 1985, Pat. No. 4,674,894, which is a continuation-in-part of Ser. No. 569,526, Jan. 9, 1984, Pat. No. 4,531,845.

[51] Int. Cl.$^4$ .......................................... F16C 17/04
[52] U.S. Cl. ................................... 384/305; 384/307
[58] Field of Search ............... 384/303, 306, 307, 369, 384/368, 400, 406, 305

[56] References Cited

U.S. PATENT DOCUMENTS

| 2,046,092 | 6/1936 | Rosendahl | 384/406 |
|---|---|---|---|
| 3,476,452 | 11/1969 | Hagg et al. | |
| 3,625,576 | 12/1971 | Miller et al. | |
| 3,806,210 | 4/1974 | Delen | 384/406 |
| 4,456,391 | 6/1984 | New | 384/307 |
| 4,501,505 | 2/1985 | Chambers | 384/306 |

FOREIGN PATENT DOCUMENTS

| 3025876 | 2/1981 | Fed. Rep. of Germany. |
| 3140017 | 4/1983 | Fed. Rep. of Germany. |
| 1335573 | 7/1963 | France. |
| 1599665 | 7/1970 | France. |

OTHER PUBLICATIONS

"Seevoil" Catalogue Entry, Heshmat et al., pp. B5-46 and B5-47 (Sep. 1984).
"A Handbook of Friction", (1-page extract)—(no date).

Primary Examiner—Lenard A. Footland
Attorney, Agent, or Firm—Dority & Manning

[57] ABSTRACT

An improved modular bearing assembly capable of operation for radical and thrust loads under starved and flooded lubricant conditions with low power losses. A journal bearing alone may be employed or journal and thrust bearings. Thrust bearings per se are also disclosed and claimed. Particular bearing characteristics are disclosed for preferred journal liner and thrust bearings.

14 Claims, 8 Drawing Sheets

BEARING ASSEMBLY

This is a continuation of application Ser. No. 4,213, filed Jan. 5, 1987, abandoned, which is a division of application Ser. No. 790,188, filed Oct. 22, 1985, now abandoned, which is a continuation-in-part of application Ser. No. 740,236, filed May 31, 1985, now U.S. Pat. No. 4,674,894, which is a continuation-in-part of application Ser. No. 569,526 filed Jan. 9, 1984, now U.S. Pat. No. 4,531,845.

BACKGROUND OF THE INVENTION

The present invention relates to a bearing assembly which is capable of attaining high load capabilities while maintaining low power losses for both flooded and starved conditions.

Hydrodynamic bearings in the form of pillow blocks have been used for at least a hundred years and still remain in wide use as lubricated bearing systems for general applications. Initially, such bearings were utilized for relatively low-speed operations at moderate radial and thrust loads. More recently, however, the range of use of such bearings has been extended due to the introduction of new lubricants, improvements in oil delivery systems, overall improvements to bearing efficiency, and the like.

Hydrodynamic bearings depend on positive pressure generation of an oil film for successful operation. In considering proper bearing operation, many factors come into play such as film thickness, lubricant temperature, operational speeds, load, and the like.

Generally speaking, bearing operations may vary considerably under different operating conditions such as the parameters noted above, and a bearing designed for one particular set of operating conditions may not perform effectively for a different set of conditions. Heretofore, such differences have led manufacturers to generally design separate bearing assemblies for specific operational parameters. Such, of course, increases not only the expense of an individual bearing assembly, but also requires the manufacturer to maintain significant inventories to meet the needs for each separate application.

It has been stated that a bearing should be capable of operation at maximum load capabilities with minimum power losses under both flooded and starved lubricant conditions. The bearing system according to the present invention approaches the aforementioned optimized bearing operation. Particularly, bearings according to the present invention have the ability to carry both radial and thrust loads at reduced power losses under both fluid film starved and flooded conditions. Furthermore, the bearing system of the present invention may be presented in a self-contained unit that requires very little maintenance, and in the same form can utilize an external source of lubricant and/or an internal circulating lubricant system.

SUMMARY OF THE INVENTION

It is thus an object of the present invention to provide an improved bearing assembly.

Another object of the present invention is to provide an improved bearing assembly that is capable of carrying radial and thrust loads while operating at high load capabilities and low power losses for both flooded and starved conditions.

Yet another object of the present invention is to provide an improved bearing assembly which is self-contained, requires little maintenance and may operate in the same form under both external or internal lubricant supply arrangements.

Still further, another object of the present invention is to provide an improved bearing assembly that is modular in concept such that the assembly may serve as a simple journal bearing, a combination journal-thrust bearing, or a simple thrust bearing.

Another object of the present invention is to provide an improved bearing assembly that performs effectively under both starved and flooded lubricant conditions.

Yet another object of the present invention is to provide improved thrust bearings that operate under starved or flooded lubricant conditions with less power loss than conventional thrust bearings.

In general, the improved bearing assembly according to the present invention comprises a housing, said housing defining a shaft receiving opening therethrough; and a liner received in said housing and defining a shaft receiving bore opening therethrough and an enlarged annulus at opposite ends of said bore opening, said liner further defining at least one lubricant delivery groove adjacent said bore opening and extending axially therealong, said lubricant delivery groove having restrictor means at opposite ends of same, said bore opening having a length to diameter ratio of from about 0.87 to about 0.92. A thrust bearing may also be secured to opposite sides of said liner. The thrust bearings have a shaft receiving bore opening therethrough concentric with said liner bore opening and include a plurality of thrust pads located in a thrust surface around the bore opening. The thrust pads have radially extending lubricant grooves or passageways located therebetween, and with oil bleeders or throttles at outer ends of same.

More specifically, two or more lubricant delivery grooves are preferably located in the liner bore opening, along opposite sides of same, and are preferably provided with openings therein for communication with an external source of lubricant which may be supplied therethrough for lubrication of the bearing. Likewise, utilizing an internal lubricant delivery system, one or more oil rings or the like may be received about the liner to rotate with rotation of a shaft received therethrough and with a portion of the ring passing through a lubricant reservoir where lubricant is removed therefrom and is transported to the rotating shaft. In a preferred arrangement, the oil ring is present with supplemental lubricant feed from an external source, if required. Likewise, with both an oil ring delivery system and an external oil delivery system, the oil ring system serves as an emergency back-up system in the event of failure of the external system.

A bearing assembly according to the present invention may include a journal bearing only, a journal bearing and thrust bearings, thrust bearings only or thrust bearings in combination with roller bearings or the like. Thrust bearings utilizable with the assembly of the present invention are secured to opposite ends of the bearing liner and define a shaft bore opening therethrough, concentric with the bore opening through the liner. A plurality of thrust pads are provided around the bore opening of the thrust bearing and extend radially outwardly therefrom. Each of the thrust pads is provided with a suitable configuration for receipt and subsequent delivery of lubricant to a thrust runner employed in conjunction therewith. In one embodiment, the thrust pads may be scalloped at opposite ends defining a compound taper with a lubricant groove located along a lower surface of adjoining scalloped areas and with a lubricant bleeder being located between said groove and an outer periphery of the thrust surface of the bearing. Likewise, in another form the thrust pads include a flat land area and a tapered area with radial oil grooves located between thrust pads.

Insofar as the overall bearing assembly of the present invention is concerned, it has been determined surprisingly through experimentation that when certain liner bore and thrust bearing characteristics are maintained within certain ranges, the bearing assembly is suitable for very wide-spread use approaching the optimized bearing assembly as discussed hereinbefore. In other words, a bearing assembly according to the present invention, and in the correct configuration is capable of maintaining high thrust and radial loads with minimal power loss under both flooded and starved lubricant conditions, and thus capable of achieving higher rotational speeds.

Important characteristics for the journal bearing liner include axial length of the bore, the length of the axial oil groove, location of oil feeding holes inside the axial oil groove, width and shape of the axial oil groove, undercutting of the upper liner bore in a slot area for receipt of oil rings, and dams located on the split surface of the liner at the entrance to the axial oil groove.

The thrust face of a liner so equipped, as noted above, is also important insofar as enhancement of thrust bearing characteristics under the overall load conditions. Features deemed to be of importance for the thrust bearings are the number of pads per thrust surface, shape of the pads, slope angle of the pads, location of the pads on the thrust surface, a separating shroud between the pads and the exterior of the bearing, and a circumferential groove delivering oil from the journal bearing to the thrust surface pads.

Additionally, modular design of the bearing assembly according to the present invention accommodates both thrust units and expansion bearings while as noted below, optimized geometry of the bore and thrust surfaces permit operation with minimum power losses for both flooded and starved lubricant conditions for ring type and/or external lubricant circulation systems. Still further, symmetrical configuration of the thrust pads for one embodiment of the thrust bearing permits bi-directional bearing operation while a large number of pads per thrust surface leaves a substantial flat area on the thrust surface, contributing to an increase in total load capacity.

Tapering of the pads on one embodiment of the thrust surface in both a circumferential and radial direction and with no peripheral openings for oil in the thrust surface therearound, limits exit of oil therefrom only through the radial bleeders, whereby there is greater effective use of the amount of lubricant present. A circumferential groove geometry on the thrust surface at the inner radius of the thrust bearing permits oil flow from the axial oil groove in the liner into each feeding groove of the thrust surface. Further, the particular design of the axial oil grooves in the bore of the journal bearing and the location of the oil inlets provides a most effective mixing of oil whereby an extended film length is realized.

Dams may also be provided, located on the split surface of the liner, at the entrance to the axial oil groove which restrict the flow of oil and direct oil into the axial oil groove. Moreover, circumferential undercutting of the upper liner portion bore in a slot area allows penetration of the oil into the clearance gap and protects from oil losses.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENT

Making reference to the figures, preferred embodiments of the present invention will now be described in detail.

Figure 1:
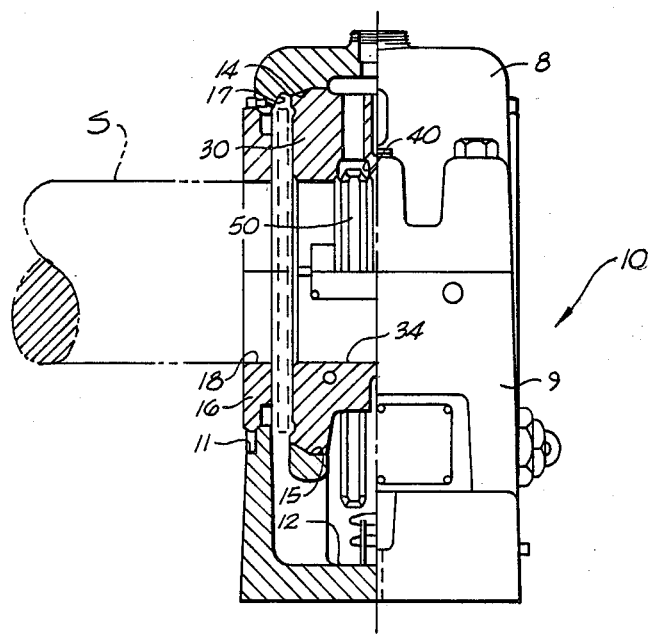
FIG. 1 is a partial cut-away view of a bearing assembly according to the present invention illustrating a partial vertical cross-section of an interior configuration of the bearing assembly.
Figure 2:
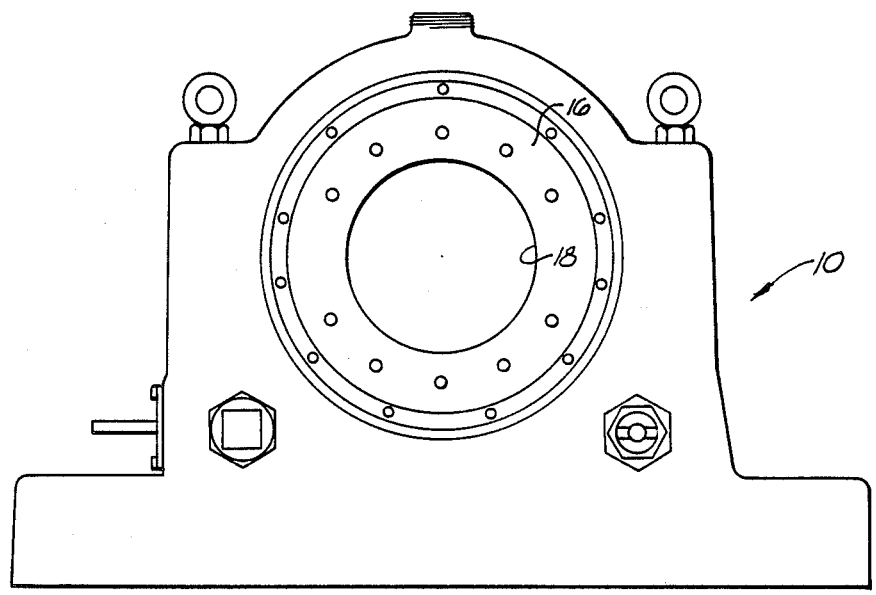
FIG. 2 is a side elevational view of a bearing assembly illustrated in FIG. 1.

FIGS. 1 and 2 illustrate one embodiment of an overall bearing assembly according to the present invention, arranged for use as a free bearing, i.e. one not intended to handle thrust loads. A pedestal housing generally 10 is provided that serves as a general enclosure for the elements of the overall assembly and defines an opening 11 therethrough for supporting receipt of a rotatable shafts as shown in phantom.

An upper housing portion 8 and a lower housing portion 9 are interconnectable to provide housing 10 with stiffness in a radial direction from a bore opening 18 located through housing 10 for receipt of shaft S. Housing 10 defines an oil reservoir 12 in lower housing portion 9 to preferably permit an oil ring utilized therewith to be submerged in oil at a level of about 15 percent of the diameter of the oil ring.

A liner, generally 30 is received within housing 10, being properly located and maintained by a plurality of liner mounts 14, 15 that are defined by an inside of housing portions 8 and 9, respectively, above and below liner 30. When the bearing assembly is properly received and secured about a shaft S, liner 30 is thus restricted from movement. Also as illustrated in FIG. 1, a space 17 is defined adjacent liner 30 on opposite sides of same (only one shown) for receipt of a thrust runner 80 (indicated in phantom) when the bearing assembly is to be employed as a fixed bearing, and as described in more detail hereinafter. A sealing ring 16 is also provided on opposite sides of housing 10 within opening 11 and defines shaft receiving bore opening 18 therethrough. Sealing ring 16, in conjunction with appropriate seals thus basically encloses housing 10 and thus the bearing assembly by inclusion of proper seals at relevant locations. Moreover, as generally illustrated but not described, housing 10 is also provided with conventional means for mounting same, ports for the addition of lubricant, means to facilitate transfer of the assembly and the like.

Figure 3:
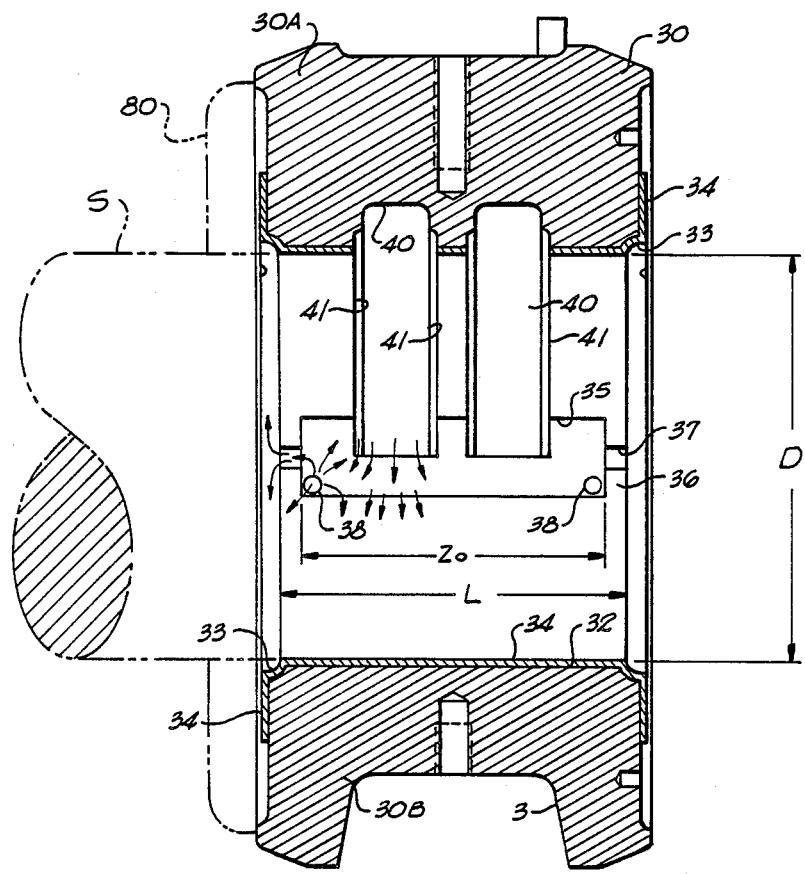
FIG. 3 is a vertical cross-sectional view of one embodiment of a journal bearing liner according to teachings of the present invention.
Figure 6:
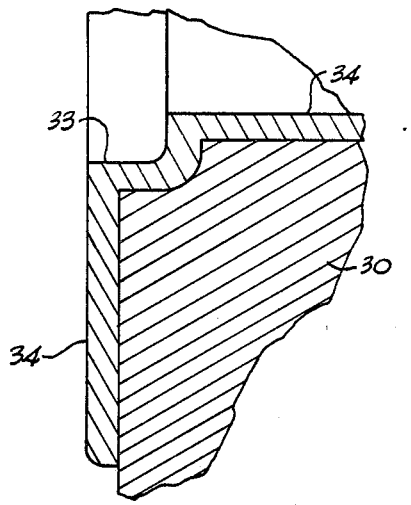
FIG. 6 is an enlarged view of a portion of an enlarged annulus provided at opposite ends of the shaft receiving bore of a bearing liner according to the present invention.

Liner 30 as illustrated in FIG. 3 includes an upper liner portion 30A and a lower liner portion 30B which are interconnected to define the overall liner structure. Unless the individual liner portions 30A, 30B are necessary for description of a particular feature, reference will be made hereinafter only to liner 30.

Liner 30 defines a shaft receiving bore opening 32 with an enlarged annulus 33 at opposite ends of same and with a journal bearing surface 34 received therein. Liner 30 further defines at least one, and preferably two or more, axial oil grooves 35 that extend along bore opening 32 with a dam or restrictor means 36 located at opposite ends of same, defining a restricted orifice 37 thereat. Oil grooves 35 also preferably define a pair of openings 38 adjacent opposite ends of same for supply of oil into groove 35 from an external oil circulation system.

Upper liner portion 30A defines at least one groove 40 therein for receipt of an oil ring 50 (see FIG. 1). Two such grooves are shown in FIG. 3 with undercut areas 41 extending along opposite sides of same. As can be seen in FIG. 1, oil ring 50 is received within groove 40 and rests atop a shaft S extending through bore opening 32. A lower portion of ring 50 resides within oil reservoir 12 preferably with about 15 percent of its diameter submerged in oil. As shaft S rotates, ring 50 rotates therewith, lifting oil from reservoir 12 and depositing same atop shaft S. Oil from shaft S then optimally forms a lubricating film for proper lubrication between shaft S and bearing assembly 10.

It has been determined that oil ring bearing lubricant systems do not supply the total lubricant requirements for full film lubrication, whereby with any oil ring system, a degree of lubricant starvation condition exists. While improvement may be achieved by particular design of an oil ring to enhance oil delivery, further improvement may be realized by use of an axial oil groove 35 as mentioned above. With an oil ring 50 delivering oil to shaft S, the undercut areas 41 adjacent grooves 40 aid in directing oil from ring 50 into axial oil groove 35.

Normally an oil film around a rotating shaft tends to diminish in thickness from a primary point of formation outwardly towards opposite ends of same. It is therefore highly desirable to attempt to maintain a uniform thickness across the entire width of the film. Further, when thrust bearings are utilized on opposite ends of a journal bearing and thus adjacent the conventional feathered film areas, inadequate lubrication of the thrust surface can result. Oil groove 35 with its restricted orifice 37 assists in maintaining a ready supply of oil across the intended film width as opposed to conventional structures whereby an improved film results. Such construction further improves the supply of oil to a thrust bearing, particularly where additional oil is supplied to groove 35 through openings 38.

A general flow of oil from groove 35 and restricts orifice 37 is indicated by the arrows in FIG. 3.

Figure 5:
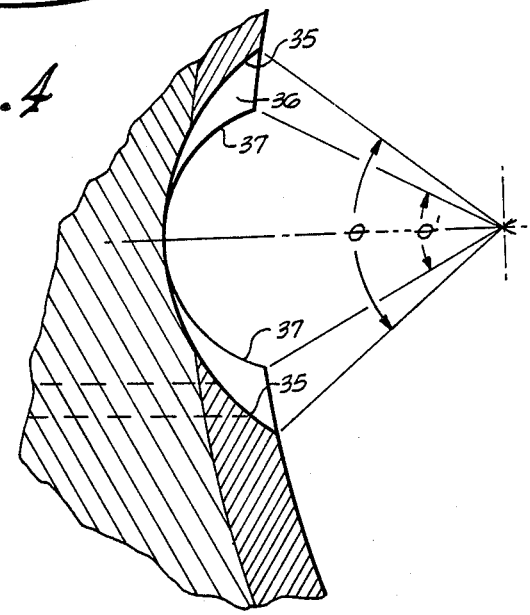
FIG. 5 is an enlarged cross-sectional view of an axial oil delivery groove present in the bore of a journal bearing liner according to the present invention.
Figure 4A:
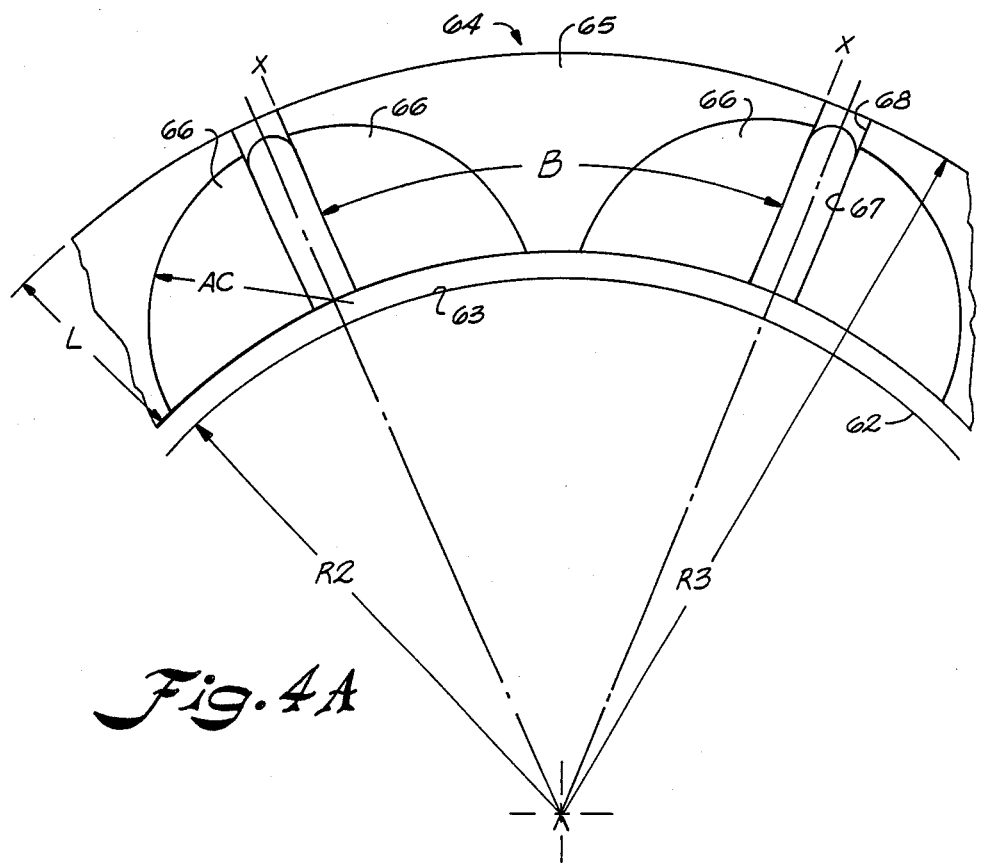
FIG. 4A is a planar view of a portion of the thrust bearing as illustrated in FIG. 4.

It has been determined that for operation under both starved and flooded conditions, as will be described in more detail hereinafter, that the ratio of the length (L) of bore 32 to diameter (D) of bore 32 as illustrated in FIG. 3 should range from about 0.87 to about 0.92. In like fashion, to minimize the feathering of the oil film outwardly from a central location from groove 35, oil inlet feeder openings 38 are preferably specifically located along groove 35. Making reference to FIG. 3, Zo indicates the distance between center lines through openings 38. It has been determined that oil feeder openings 38 should be located along oil groove 35 to achieve a ratio of Zo/L of from about 0.76 to about 0.87, again to afford a bearing capable of operating under both starved and flooded conditions without excess power loss. Further, refering to FIG. 5, it is seen that lines drawn from extremeties of groove 35 to a point of intersection at a center line axial to the bore of liner 30 form an angle $\theta$ while similar lines drawn from extremeties of orifice 37 form an angle $\theta'$. For operation under starved and flooded conditions, angle $\theta$ is preferably about 30° while angle $\theta'$ is preferably about 20°.

Figure 4:
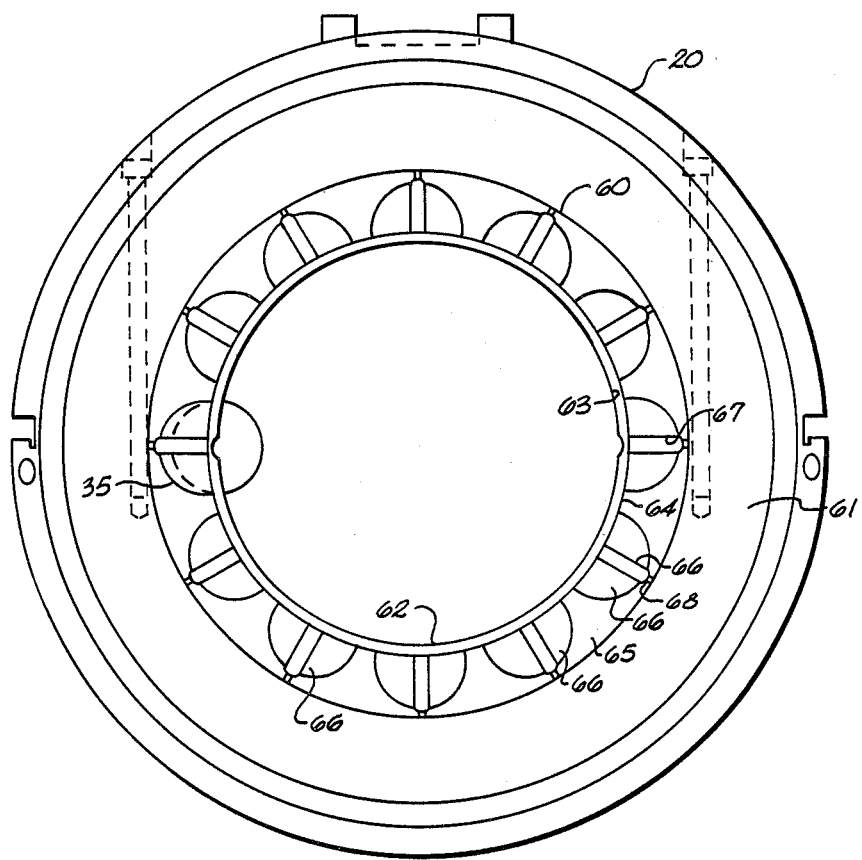
FIG. 4 is an end elevational view of an end of the liner as shown in FIG. 3 illustrating one embodiment of a thrust bearing secured to same.

Oil groove 35 as noted above, further feeds a thrust bearing 60, if same is employed. When a fixed bearing arrangement is desired, a thrust bearing 60 (see FIG. 4) is secured to opposite sides of liner 30. Additionally, a thrust runner 80 illustrated in phantom in FIGS. 1 and 3 is located adjacent bearings 60 secured to shaft S within space 17, thus affording a thrust load capability for the bearing assembly.

Referring to FIGS. 4, 4A, 7, and 8 it may be seen that a thrust bearing generally 60 may be provided with the bearing assembly of the present invention. Thrust bearing 60 is located on a base 61 defining a shaft receiving bore opening 62 therethrough. Located about bore opening is an annular oil groove 63. Located about bore opening 62 and annular groove 63 are a plurality of thrust pads 64 which include a flat land portion 65 and composite tapered or scalloped portions 66 at opposite ends of same. As may be specifically seen in FIG. 4A, a thrust pad 64 includes the area between lines X, X, thus incorporating two scalloped areas 66. Scalloped areas 66 of adjacent thrust pads 64 have a radially extending oil groove 67 therebetween that communicates with an oil bleeder 68 at an outer end of same. Radial grooves 67 and oil bleeder 68 extend from annular oil groove 63 through bearing surface 60.

In operation, with shaft S rotating, oil is supplied to axial oil groove 35 of liner 30 via one or more oil rings 50 or oil rings 50 and an external oil circulation system (not shown) that is in communication with axial groove oil inlet feeder openings 38. Oil then escapes groove 35, forming an oil film on shaft S for lubrication of same.

As shaft S rotates, oil is provided to thrust bearings 60, if present, by passing from orifices 37 into annular groove 63 about bore opening 62 and then into thrust pad scalloped areas 66 and oil grooves 67. With a thrust runner 80 adjacent thrust bearing 60, lubricant located in radial grooves 67, feeds scalloped areas 66 and is generally confined therein for improved bearing lubrication. In fact, excess oil may escape from thrust pads 64 only through bleeders 68 after which it returns to reservoir 12 of housing 10. Composite tapered portions 66 of thrust pads 64 are symmetrical, leading to reduced costs of production, and also a capability of bidirectional rotational operation.

Figure 7:
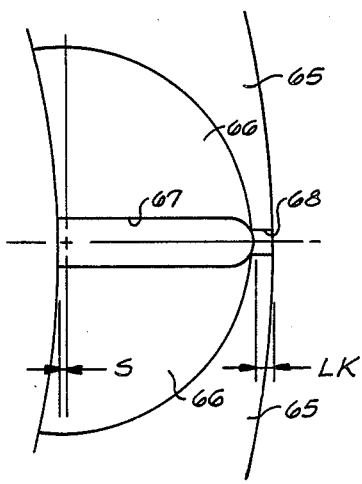
FIG. 7 is an enlarged view of a portion of a thrust pad according to the thrust bearing embodiment illustrated in FIG. 4.
Figure 8:
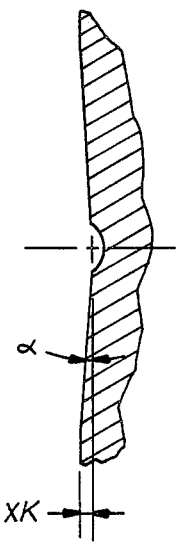
FIG. 8 is an enlarged view of a further embodiment of a thrust pad as illustrated in FIG. 4.

A most preferred embodiment of thrust bearing 60 may be defined according to the following characteristics as best described in FIGS. 3, 7, and 8. Scalloped areas 66 as mentioned above include a compound taper in both radial and circumferential directions. In FIG. 7, the dimension S represents the distance between an inner radius of scalloped areas 66 and the central point of location of a cutting tool used to produce areas 66. The distance S may, in fact, be a positive number (in a direction outwardly of area 66) or a negative number in an opposite direction. Preferably, the value of S ranges from about 0.03 to about −0.04 inch. Also illustrated in FIG. 7 is a dimension LK indicative of the length of oil bleeder 68 which preferably ranges from about 0.05 to about 0.10 inch. FIG. 8 illustrates the angle alpha associated with scalloped areas 66 as well as the depth XK of scalloped area 66 down to the top of radial grooves 67. Such is measured along a line Ac coincident with a deepest portion of scalloped areas 66. Preferably angle alpha should be about 0.5 degrees, while XK should range from about 0.005 to about 0.010 inch. A further important characteristic of bearing of bearing 60 is the ratio of the radial length of the thrust surface (L) to the length of an arcuate line B extending across the middle of the thrust pad. Preferably L/B ranges from about 0.65 to about 1.04. The thrust bearing characteristics noted above are most preferred characteristics for specific bearings having a number of thrust pads ranging from about 8 to about 12.

Figure 9:
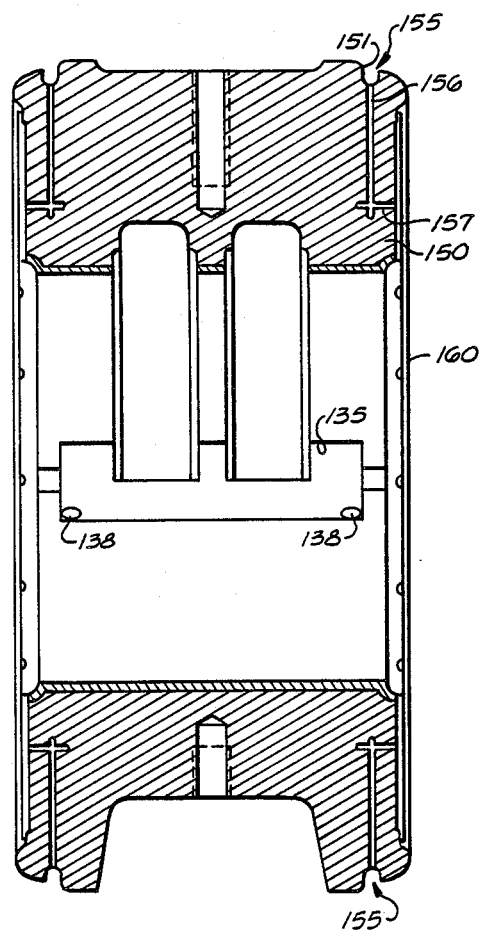
FIG. 9 is a vertical cross-sectional view of a further embodiment of a bearing liner according to the present invention.

A further embodiment of a thrust bearing arrangement is illustrated in FIGS. 9, 10, 11 and 12. In FIG. 9, a bearing liner 150 is illustrated which is of like general construction and has the same preferred characteristics as liner 50 of FIG. 3 except for a plurality of lubricant ports generally 155, received around opposite sides of same. Lubricant ports 155 include a first circumferential leg 156 that communicates with a groove 151 extending around the periphery of liner 150 and an axially extending leg 157 that extends into communication with a thrust bearing generally 160. Lubricant grooves 151 may also communicate with oil delivery openings 38 of axial oil groove 135.

Figure 10:
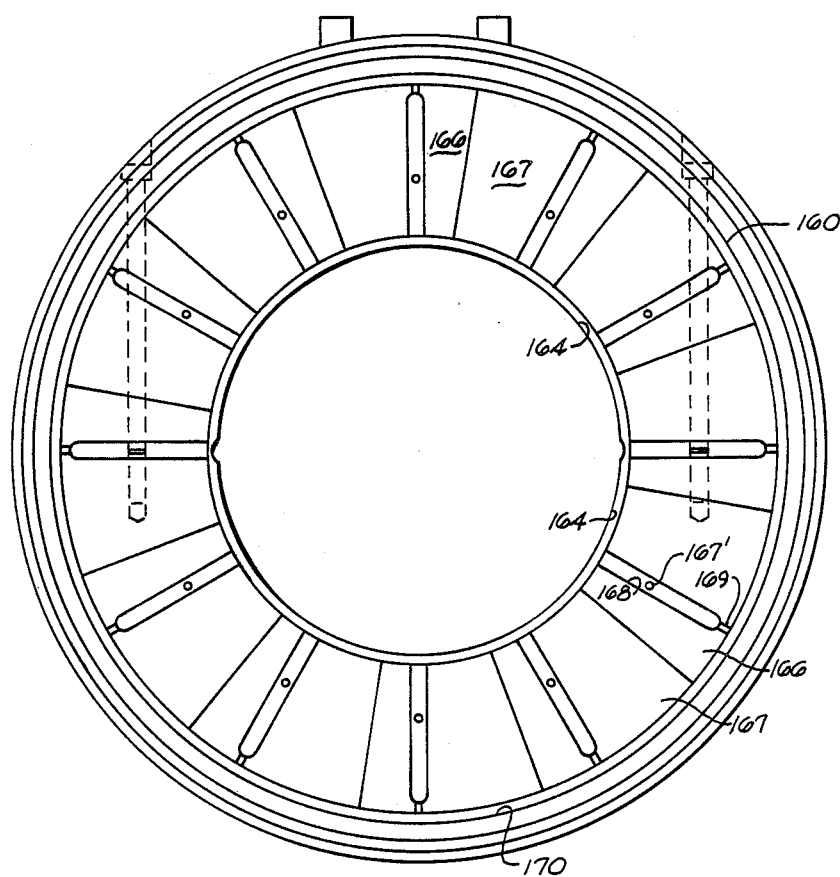
FIG. 10 is an elevational view of a further embodiment of a thrust bearing secured to opposite ends of the liner as illustrated in FIG. 9.

As illustrated in FIG. 10, thrust bearing 160 is located on a base 161 and has a plurality of thrust pads 165 located around an inner annular oil groove 164, extending radially outwardly therefrom. Each thrust pad 165 includes a flat land portion 166 and a tapered land portion 167. A radially extending oil groove 168 is located between thrust pads 165 and extends from annular groove 164 to an oil bleeder 169 which terminates at an outer annular oil groove 170. Radial oil grooves 168 also define an oil supply opening 167' in a bottom of same, (See FIG. 11) which communicate with axial legs 157 of the oil delivery ports 155 whereby oil may be positively supplied to thrust bearing 160. Liner 150 and thrust bearings 160 are more precise than the liner-thrust bearing arrangement of FIGS. 3 and 4, and are capable of carrying more thrust load. The liner-thrust bearing arrangement of FIGS. 9, 10, 11 and 12 are unidirectional bearings intended for premium performance situations, though reverse rotation is possible with lesser performance.

Figure 11:
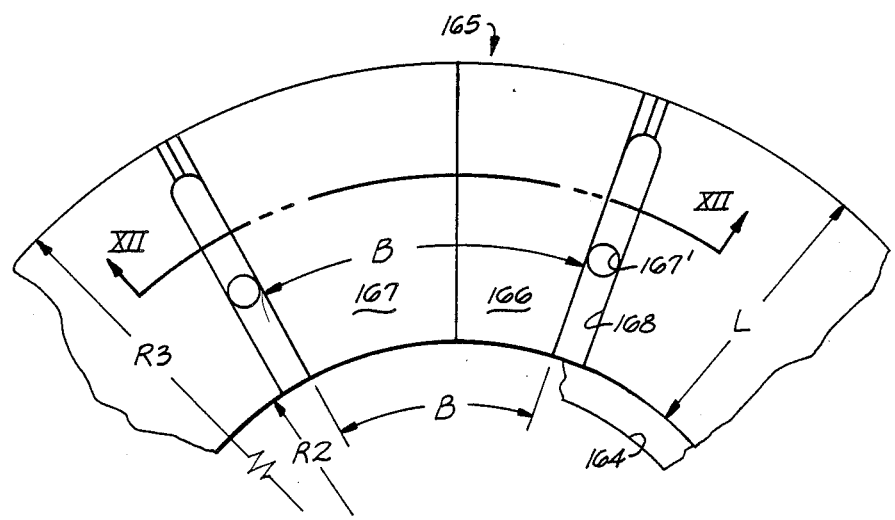
FIG. 11 is a further detailed planar view of a portion of the thrust bearing embodiment as illustrated in FIG. 10.
Figure 12:
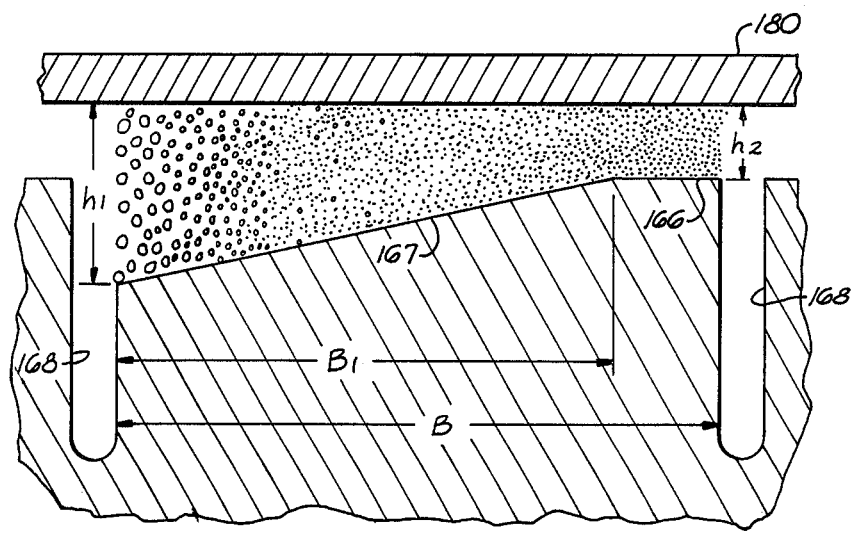
FIG. 12 is cross-sectional view of a portion of the trhust being surface illustrated in FIG. 11 taken along a line XII—XII, and with a portion of a thrust runner in cross-section adjacent thereto.

Thrust bearing 160 also possesses characteristics which are preferably controlled within certain limits for improved bearing operations under both starved and flooded conditions. FIGS. 11 and 12 illustrate such characteristics. The ratio of the radial length L of the thrust bearing 160 to the radius $R_3$ measured from a central point of the bearing to an outer edge of the thrust surface should range from about 0.253 to about 0.325 inch. The base angle B of the thrust pads 165 is preferably about 27 degrees. B represents the circumferential distance at about the middle of the thrust pad determined by the formula $R_3-R_2/2$ where $R_3$ is described above and where $R_2$ is the radius of the inner circumference of the thrust surface. The ratio of the radial length L of the thrust pad to the circumferential length B of the pad preferably ranges from about 0.61 to about 1 and most preferably is approximately 0.8. The ratio of the circumferential length of the tapered portion $B_1$ of pad 165 to the total length B of pad 165 preferably ranges from about 0.72 to about 0.75. The ratio L/B as defined with respect to thrust bearing 60 preferably ranges from about 0.66 to about 0.80 for thrust bearing 160. Also, the ratio of the distance between the thrust bearing 160 and the thrust runner 180 at the flat land 166 ($h_1$) to the deepest tapered portion 167 ($h_2$) should be about 2.45.

In arriving at the bearing characteristics noted above as preferable for bearings according to the presention to properly operate under both starved and flooded conditions, testing was conducted. Two test bearing assemblies were mounted on a shaft flexibly coupled to a 100 horsepower vari-drive motor. One of the bearing assemblies included a thrust face while the other was a free bearing. The load was applied via a hydrostatic bearing between the journal bearings. The test bearings were also constructed for oil ring and external lubrication. External oil supply was provided via the holes described herein in the axial oil grooves. Bearing characteristics as identified herein, were varied to ascertain ranges that were operable with mimimum power losses under both starved and flooded conditions. Appropriate pressure taps, thermocouples and eccentric probes were installed. Lubricant used was SAE 10, SAE 20 and SAE 30 oil. Test results indicated the characteristics and ranges set forth in Table I to be important for the bearing liner and for thrust bearing 60. Table II represents the characteristics for thrust bearing 160.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. An improved bearing assembly comprising:
   (a) a housing, said housing defining a shaft receiving opening therethrough;
   (b) a liner received within said housing and defining a shaft receiving bore opening therethrough, said liner further defining an enlarged annulus at opposite ends of said bore opening, said liner further defining at least one lubricant delivery grove in communication with said bore opening and extending axially therealong, said at least one lubricant delivery groove having flow restrictor means at opposite ends of same;
   (c) a thrust bearing secured to opposite sides of said liner, said thrust bearings defining a bore opening therethrough and having a plurality of thrust pads equidististantly spaced about said bore opening with a lubricant groove therebetween with an oil bleeder at out ends of same, said thrust pads having a planar land surface and a tapered surface; and
   (d) a thrust runner located adjacent each thrust bearing.

2. A bearing assembly as defined in claim 1 wherein said liner further defines a plurality of lubricant delivery openings therearound corresponding to said lubricant grooves in said thrust bearing and wherein said thrust bearing defines a lubricant ingress opening in each groove in communication with said lubricant delivery openings in said liner whereby during operation, lubrican may be delivered through said liner into each of said thrust grooves.

3. A bearing assembly as defined in claim 2 wherein the ratio of the radial length of the thrust bearing to the radius of the bearing measured from a central point to an outer edge of the thrust surface ranges from about 0.253 to about 0.325.

4. A bearing assembly as defined in claim 2 wherein the ratio of the circumferential length of the tapered portion of each thrust pad to the total circumferential length of the pad ranges from about 0.72 to about 0.75.

5. A bearing assembly as defined in claim 2 wherein the ratio of the radial length of each thrust pad to the circumferential length of the pad ranges from about 0.66 to about 0.80.

6. A bearing as defined in claim 2 wherein the distance between the thrust surface and the thrust runner at the planar land surface for said bearing ranges from about 0.0007 to about 0.0015 inch.

7. A bearing assembly as defined in claim 6 wherein the ratio of the distance between the thrust surface and the thrust runner at the deepest tapered surface to the distance therebetween at the planar land surface is approximately 2.45.

8. An improved thrust bearing comprising a base, said base defining a bore opening therethrough and an annular oil groove therearound, said base further defining a thrust surface thereon, said thrust surface defining a plurality of thrust pads therearound, a radial oil groove located between adjacent thrust pads and an oil bleeder located at an outer end of each oil groove and in communication therewith, said thrust pads comprising a flat land portion and a tapered portion, whereby said thrust bearing when used in conjunction with a thrust runner is capable of operation under both starved and flooded lubricant conditions with low power losses.

9. An improved thrust bearing as defined in claim 8 wherein the ratio of the circumferential length of the tapered portion of each thrust pad to the total circumferential length of the pad is from about 0.72 to about 0.75.

10. An improved thrust bearing as defined in claim 8 wherein the ratio of the radial length of the thrust bearing to the radius of the bearing measured from a central point to an outer edge of the thrust surface is from about 0.253 to about 0.325.

11. An improved thrust bearing as defined in claim 8 wherein the angle formed by lines drawn from the extremities of the radial oil groove to a point of intersection at a center line axial to the bore is about 27 degrees.

12. An improved thrust bearing as defined in claim 8 wherein 12 thrust pads are provided.

13. An improved thrust bearing as defined in claim 8 wherein the ratio of the distance between the thrust surface and a thrust runner used in conjunction therewith at the deepest tapered portion to the distance therebetween at the planar land portion is approximately 2.45.

14. An improved bearing as defined in claim 8 wherein the ratio of the radial length of each thrust pad to the circumferential length of the pad is from about 0.61 to about 1.

* * * * *